United States Patent
Genitrini

(10) Patent No.: US 7,621,235 B2
(45) Date of Patent: Nov. 24, 2009

(54) CAT TOY PARK

(75) Inventor: Christian Genitrini, New York, NY (US)

(73) Assignee: E&C Business Solutions, Inc., Las Vegas, NV (US)

( * ) Notice: Subject to any disclaimer, the term of this patent is extended or adjusted under 35 U.S.C. 154(b) by 334 days.

(21) Appl. No.: 11/423,445

(22) Filed: Jun. 11, 2006

(65) Prior Publication Data

US 2007/0283899 A1    Dec. 13, 2007

(51) Int. Cl.
A01K 15/02    (2006.01)
A01K 29/00    (2006.01)

(52) U.S. Cl. .......... 119/706; 119/708

(58) Field of Classification Search ......... 119/707, 119/702, 705–708, 28.5, 537, 701; 446/75, 446/227, 487; 5/417, 420
See application file for complete search history.

(56) References Cited

U.S. PATENT DOCUMENTS

| | | | |
|---|---|---|---|
| 1,100,624 A | 1/1914 | Shideler | |
| 2,096,078 A | 10/1937 | Windson | |
| 2,628,094 A | 2/1953 | Matrejek | |
| 3,097,626 A | 7/1963 | Felten | |
| 3,295,499 A * | 1/1967 | Manchester | 119/708 |
| 3,716,029 A * | 2/1973 | Pillsbury, Jr. | 119/701 |
| 3,721,414 A | 3/1973 | Yoder | |
| 4,147,129 A * | 4/1979 | Ruplen | 119/28.5 |
| 4,188,745 A * | 2/1980 | Harvey et al. | 446/227 |
| D257,293 S | 10/1980 | Michalski | |
| D269,821 S | 7/1983 | Hurley | |
| 4,497,279 A | 2/1985 | Bell | |
| 4,499,855 A | 2/1985 | Galkiewicz | |
| 4,517,922 A | 5/1985 | Lind | |
| 4,627,588 A * | 12/1986 | Block | 248/163.2 |
| 4,790,265 A | 12/1988 | Manson | |
| 5,055,083 A * | 10/1991 | Walker et al. | 446/478 |
| 5,076,520 A * | 12/1991 | Bro | 248/165 |
| 5,111,771 A | 5/1992 | Mathews | |
| 5,148,769 A | 9/1992 | Zelinger | |
| D334,254 S | 3/1993 | Mitchell | |
| 5,339,770 A | 8/1994 | Haffner | |
| 5,413,068 A * | 5/1995 | Segal | 119/537 |
| 5,474,032 A | 12/1995 | Krietzman et al. | |
| 5,496,232 A | 3/1996 | Morris et al. | |
| 5,577,465 A | 11/1996 | Cook | |
| 5,577,466 A | 11/1996 | Luxford | |
| 5,611,721 A | 3/1997 | Hoeting et al. | |
| 5,657,721 A | 8/1997 | Mayfield et al. | |
| 5,713,306 A | 2/1998 | Johnson | |
| 5,782,207 A | 7/1998 | Goodham | |

(Continued)

Primary Examiner—Son T. Nguyen

(57) ABSTRACT

A cat toy park having an open configuration and a closed configuration, comprising: a base having opposing base portions and a substantially centrally disposed base portion, the opposing base portions hingedly connected to the substantially centrally disposed base portion, the opposing base portions and the substantially centrally disposed base portion substantially collinear with each other when the cat toy park is in the open configuration, the opposing base portions substantially transverse to the substantially centrally disposed base portion when the cat toy park is in the closed configuration; support arms adapted to be releasably attached to the base and releasably connected one to the other, the support arms extending above the base, when the cat toy park is in the open configuration; at least one cat toy adapted to be removably attached to the cat toy park, and typically having a plurality of replaceable suspended and base mounted cat toys.

21 Claims, 12 Drawing Sheets

U.S. PATENT DOCUMENTS

| | | | |
|---|---|---|---|
| 5,842,440 A | 12/1998 | Bell, Jr. | |
| 5,875,737 A | 3/1999 | Boshears | |
| 5,881,677 A * | 3/1999 | Schmitt | 119/526 |
| 5,913,750 A | 6/1999 | Smithback | |
| 5,928,054 A * | 7/1999 | Mast | 446/227 |
| 6,016,771 A | 1/2000 | Baiera et al. | |
| 6,058,887 A | 5/2000 | Silverman | |
| D431,331 S | 9/2000 | Smith | |
| D452,050 S | 12/2001 | Ritchey | |
| 6,360,692 B2 | 3/2002 | Gear | |
| 6,378,463 B1 | 4/2002 | Simmons | |
| 6,378,464 B1 | 4/2002 | Ritchey | |
| 6,481,381 B2 | 11/2002 | Ritchey | |
| 6,499,436 B1 * | 12/2002 | Capperrune | 119/792 |
| 6,568,353 B2 | 5/2003 | Van Sluis | |
| 6,575,119 B1 | 6/2003 | Lonsway | |
| 6,619,237 B2 | 9/2003 | Robertson | |
| 6,629,510 B1 | 10/2003 | Robkin | |
| 6,640,750 B2 | 11/2003 | Rowe et al. | |
| 6,702,643 B1 * | 3/2004 | Drosendahl et al. | 446/227 |
| 7,302,724 B2 * | 12/2007 | Solomon et al. | 5/655 |
| 7,376,993 B2 * | 5/2008 | Myers et al. | 5/655 |
| 2003/0019434 A1 * | 1/2003 | Spires et al. | 119/28.5 |
| 2004/0266312 A1 * | 12/2004 | Oren et al. | 446/227 |
| 2006/0040582 A1 * | 2/2006 | Hopper et al. | 446/75 |
| 2006/0225664 A1 * | 10/2006 | Zych | 119/537 |
| 2006/0286891 A1 * | 12/2006 | Knight et al. | 446/75 |

* cited by examiner

CAT TOY PARK

FIELD OF THE INVENTION

The present invention relates generally to cat toys and more particularly to cat toy parks.

BACKGROUND ART

Cats and felines are known to be quite agile and capable of playing for extended periods of time, especially if appropriate distractions and toys are provided for their amusement and enjoyment. Cat, feline, pet, animal toys, and the like have been known. However, most often a single toy is provided for the cats, felines, and pets to play with, and, in particular, since cats and felines are easily distractible, a single toy is usually insufficient for them to entertain themselves for extended periods of time. A cat toy park is needed that has a plurality of cat toys that are stimulating to the cats and felines and that the cats and felines can play with and entertain themselves with for extended periods of time.

Cats and felines often live in urban or even suburban environments, where space is at a premium. Therefore, although a cat toy park is needed that has a plurality of cat toys that are stimulating to the cats and felines and that cats and felines can play with and entertain themselves with for extended periods of time, the cat toy park needs to be capable of being stored, when not in use, and quickly and easily be deployable for use, when desired.

A cat toy park that folds into a suitcase type structure, when not in use, that can be easily transported and/or stored as desired, and unfolds into a substantial play area and has a plurality of toys, when deployed for use and entertainment of the cats and felines, is needed.

Cats and felines have a need to feel that they have captured prey, and, as a result, often damage and destroy their toys and play things. Such aggressive behavior is part of their natural instinct. Therefore, a cat toy park that has removably replaceable cat toys is needed.

Different cat, feline, animal, and pet amusement devices have heretofore been known. However, none of the cat, feline, animal, and pet amusement devices adequately satisfies these aforementioned needs.

U.S. Pat. No. 6,378,463 (Simmons) discloses an interactive pet device for providing exercise, entertainment and a resting area for cats. The interactive pet device includes a first plate. The first plate has a top side, a bottom side and a peripheral wall extending therebetween. A second plate has a top surface, a bottom surface and a peripheral wall extending therebetween. A plurality of posts position the first and second plates in a spaced relationship. Each of the posts has a first end and a second end. Each of the first ends of the plurality of posts is securely coupled to the top surface of the second plate. Each of the second ends is securely coupled to the bottom side of the first plate. A plurality of elongate flexible members, each have a first and second end. Each of the first ends of the elongate flexible members is securely coupled to the bottom side of the first plate. Each of a plurality of toys is securingly coupled to one of the second ends of the elongate flexible members.

U.S. Pat. No. 6,640,750 (Rowe, et al.) discloses an electric feline play center having a tunnel, sized for a cat to fit through, a scratching post with a hanging chew toy and an electronic ball tube wherein a fan blows colored balls around within a mesh tube, devised to occupy one or more cats.

U.S. Pat. No. 5,339,770 (Haffner) discloses an exercise and amusement toy for a dog or other pet, including a supported umbrella-shaped top or dome with toys suspended by resilient lines, such as ropes or cables from the rim of the dome. The dome is supported and held upright by an intermediate elongated standard member, which in turn is supported by a portable base plate. The intermediate member is formed of an upper spring member that is coupled to a lower stationary tubular member. The spring member allows for rotation and slight bending motion of the dome, when the pet plays with the suspended toys. The preferred embodiment is suitable for indoor and outdoor use. In another embodiment, the lower stationary tubular member tapers to a point resembling a typical stake. A pet owner can then drive the tubular member into the ground, preferably outdoors, thus securing the pet toy in an upright position without use of the base plate.

U.S. Pat. No. 5,148,769 (Zelinger) discloses an amusement device having suction cup base and interchangeable pet toy or amusement device for pet animals, which includes an arcuately shaped spring-like wire removably mounted at one end to a suction cup base and extending generally upwardly and sidewardly therefrom. The free end of the wire has a toy removably suspended therefrom. The base is removably mounted to a mounting surface as by suction, and which mounting surface may have a variety of orientations.

U.S. Pat. No. 5,875,737 (Boshears) discloses an animal amusement device, which includes a base having an upwardly opening recess in which a corrugated scratch pad is installed. A pole extends upwardly from the base through the scratch pad and journals at its upper end a rotatable arm. The arm suspends an object by a flexible tether cord radially outward from the pole and above the level of the upper surface of the scratch pad. In another embodiment, the arm is mounted to a drive shaft of a motor secured in the pole, whereby the object may be driven in a circular path about the pole by the motor.

U.S. Pat. No. 6,016,771 (Baiera, et al.) discloses a toy for pets to induce and maintain the interest of the pet, without human participation. A movable support for suspending a toy character therefrom may be mounted in a base member having a rounded bottom wall. When the toy character is batted by a pet, both the support and base member move in random patterns, acting to enhance the movement of the toy character.

U.S. Pat. No. 5,713,306 (Johnson) discloses a feline playground system for domestic cats that provides scratching, climbing, resting, playing, sleeping and observation facilities for the house kept cat, as a "knockdown" assembly that can be erected or disassembled. A main assembly is comprised of several sections and sizes of cylindrical shapes that are attached in-line end to end via internal fasteners that are threaded to prevent accidental separation. Once the sections are fully assembled a drop-in pressure maintaining device that is preassembled is installed at the top end together with a mobile multiple toy holder. The largest diameter assembly serves as the "house," and the roof serves as an observation deck, as an elevated play deck from where the cat can reach and play with toys attached to the mobile multiple toy holder. The bottom of the "house" serves as a mounting for the anchor that suspends other toys between the "house" and the floor. The full assembly when installed between the floor and ceiling of a room is self supporting and is afforded stability through the constant application of pressure derived from the pressure maintaining device.

U.S. Pat. No. 6,568,353 (Van Sluis) discloses a playhouse for cats that provides a container with perforations and an interior containing various mouse and other cat toys, which may be accessed through the perforations by a cat's arm. The mouse toys may include a figure atop a moveable spring, a removable mouse, one or more mice on a turntable, musical, and sound mice. Other cat toys can include balls, which rattle when moved, and toys which can emit a variety of sounds based on a battery powered sound chip. The playhouse can be used to evaluate feline aggressiveness, docility and other traits for breeding and feeding, for psychological purposes, for exercise, for coordination, and to relieve boredom.

U.S. Pat. No. 6,058,887 (Silverman) discloses a cat amusement device, which has a base, which has at least one base side, a base top and a base bottom. The cat amusement device also has: at least one microchip contained within the base or post; a power means electrically connected to the at least one microchip, which is audio capable; at least one speaker electrically connected to the at least one microchip, functioning to transmit preselected audio sounds from the at least one microchip; at least one arm connected to the motor; an arm holder at a distal end connectable to a toy. The toy is selected to be attractive to a cat, and may be feathered to resemble a bird or may be furry to represent an animal. The at least one microchip has preselected sounds, which are emitted from the at least one speaker. When a cat is detected by the at least one motion detector, an electrical signal is transmitted to the at least one microchip, which activates the motor, rotating the at least one arm having the toy attached at the distal end thereof.

U.S. Pat. No. 4,517,922 (Lind) discloses a pet amusement device, for the amusement of pets (and in particular cats), which includes a flat horizontal base and a post secured to the base adjacent its periphery, which extends upwardly therefrom, so that an upper end of the post is positioned over and above a central portion of the base. A coiled spring is secured to the upper end of the post and extends upwardly therefrom, so that a free outer end of the coiled spring is positioned over and above the central portion of the base. A pet toy aromatized with catnip is attached to the bottom end of a cord, the top end of which is selectively secured to the free outer end of the coiled spring by a suitable fastener. The pet toy is, thus, resiliently suspended over the base. In addition, the pet toy, post and base have durable coverings penetrable by pet claws.

U.S. Pat. No. 6,575,119 (Lonsway) discloses a suspended dog amusement apparatus, system and method, for amusing and exercising large breed dogs. The apparatus comprises a bar, a first suspension element for suspending the bar from a horizontal member at a support point on the bar, a weight element secured to the bar that applies a first gravitational torque to the bar about the support point, and a second suspension element secured to the bar that comprises a strand-like member attached to a resilient dog toy and which produces a second gravitational torque to the bar about the support point. When the apparatus is at rest, the gravitational torque forces produced by the weight element and the second suspension element are in counterbalanced equilibrium. When a dog engages the apparatus, the first and second gravitational torques are such as to provide an unpredictable and random movement of the resilient dog toy. A suspended dog amusement system is also disclosed that comprises the above-referenced elements plus a first suspension system, comprising a strand-like member, an anchor, and a plurality of pass-through devices for raising and lowering of the apparatus by the dog's owner. A method for providing amusement and exercise to a dog is also disclosed.

U.S. Pat. No. 4,499,855 (Galkiewicz) discloses a kitty tease, which includes an entertainment and exercise toy that is manipulated by a human operator, and is for exercising a small animal, such as a cat or kitten. The apparatus comprises a handle to which there is attached a rod tapering from a base end to an attaching end. The tapering of the rod is such that the rod has increased flexibility from the base end to the attaching end. Attached at the attaching end is a non-stretchable cord. The other end of non-stretchable cord includes a target member, which may be a soft ball, a brightly colored ribbon, or a soft sculptured mouse. Independent of which type of target member is used, the target member includes a covering or material suitable for grasping or gripping by the claws of a cat or kitten, such that the cat or kitten may pull thereon. In play, the target member may be dangled in front of the cat or kitten, so as to attract the attention of the animal to induce the animal to grasp and pull the target member, until the rod bends and eventually springs away.

U.S. Pat. No. 6,378,464 (Ritchey) discloses a pet-play apparatus for interactive use with a pet and solo use by the pet, which incorporates a crop formed as a wand or a loop, a lash formed of a fabric tube, one end of the lash being affixed to the crop, and a toy detachably coupled to another end of the lash. A hook-and-loop attachment device, having a hook part and a loop part, is affixed to the lash. A similar hook-and-loop attachment device, also having a hook part and a loop part, is affixed to the toy. When the pet-play apparatus is configured for interactive use, the lash hook part is engaged with the toy loop part, and the lash loop part is engaged with the toy hook part, both attachment devices being located within the toy. When the pet-play apparatus is configured for solo use, the toy hook part is engaged with the toy loop part.

U.S. Pat. No. 6,481,381 (Ritchey) discloses a pet-play apparatus for interactive use with a domestic cat or other pet, which incorporates a lash made of a strip of fake fur formed into a tube, with a nap of the fake fur upon an external surface of the tube, a crop coupled to a first end of the lash, a toy detachably coupled to a second end of the lash, and a sonic device coupled to the crop and configured to produce a prey-sound, for the domestic cat or other pet, in the form of a chirp or squeak, in response to a movement of the crop. A first attachment device is affixed to the second end of the lash and incorporates a hook part of a hook-and-loop fastener. A second attachment device is affixed to the toy and incorporates a loop part of the hook-and-loop fastener, the hook and loop parts being detachably coupled to each other.

U.S. Pat. No. 5,111,771 (Mathews) discloses an exercise and amusement toy for a dog or other pet, which includes a reinforced rubber tube stuffed with a sponge rubber stuffing. A bottom panel is attached to the tube. A rope is passed through the tube and through a hole in the bottom panel and is secured with a knot. The rope is then attached to a resilient tether, which is suspended from a mounting bracket, ceiling, or tree limb. The tube is covered with a bag made of a fur-like material, which closes at the top with a draw string. In another embodiment, the body member is made of a retrieving dummy.

U.S. Pat. No. 5,474,032 (Krietzman, et al.) discloses a suspended feline toy and exerciser device, which is adapted to be selectively mounted over the top of an existing dwelling door to allow the pet to interact with the device and "play by itself," or the device may be hand held to initiate exercise. The device comprises a plurality of wands, flexible or rigid, a tether, and a target object.

The device may further combine a counterweight and a stop selectively mounted on the tether, all of which increase the eccentricity of the orbit of the target object, when the target is encountered by the pet.

U.S. Pat. No. 6,629,510 (Robkin) discloses a randomly moving pet amusement device with a flexible attachment, which includes a cat toy comprising a randomly moving body and one or more attached members. The pseudo-random mechanical motion of the body is transmitted by the member to a free end of the member. Angular momentum tends to keep the free end of the member moving near the ground, thus, creating a moving object attractive to cats, inducing them to play and exercise.

U.S. Pat. No. D431,331 (Smith) discloses an ornamental design for a cat toy, and U.S. Pat. No. D452,050 (Ritchey) discloses an ornamental design for a pet toy U.S. Pat. No. 5,657,721 (Mayfield, et al.) discloses a Cat exercise toy, in which local and remote motion detectors sense the presence or movement of a cat in an area near the toy and in an area remote from the toy. In response to the motion detectors, an electric motor moves a target to attract the cat. A device disconnects the target from the electric motor, when the cat subdues the target, allowing the target to stop moving while being held by the cat, and giving the cat an artificial sense of "post-kill" satisfaction, while simultaneously prolonging the component life of the toy.

U.S. Pat. No. 5,782,207 (Goodham) discloses an interactive pet toy. A pet toy provides a tubular housing having a toy mouse that is extended from and retracted into the tubular housing by means of a bicycle brake or similar driving cable that is manually operated by the cat's owner using a handle. The tubular housing carries a decorative cloth cover, and is closed at one end by an end cap, having a drilled hole through which the bicycle cable passes. The outer hollow portion of the bicycle cable is fastened to the end cap. The forward end of the inner wire cable extends through the tubular housing, where it is attached to the mouse, while the rearward end of the inner cable is attached to the handle. The mouse provides a tubular body, having a cloth covering. Whisker-like filaments extend from the forward end of the body to attract the cat. The tubular body is filled with glue, which keeps the whiskers and the inner wire cable securely fastened.

U.S. Pat. No. 5,842,440 (Bell, Jr.) discloses a self-grooming aid for animals, especially felines, whereby they can brush their fur or hair, and can exercise or sharpen their claws. The animal can stand at least partially on a base adapted to be clawed, and with the animal's head or body at the level of a brush adapted to be rubbed. The brush is removable for cleaning or manually brushing the animal, and the mat is removable for replacement, when thoroughly clawed.

U.S. Pat. No. 3,097,626 (Felten) discloses an animal exerciser. U.S. Pat. No. 3,295,499 (Manchester discloses animal amusement and exercising devices. U.S. Pat. No. 2,096,078 (Windson) discloses a dog exerciser. U.S. Pat. No. 2,628,094 (Matrejek) discloses a reversible roundabout toy. U.S. Pat. No. 1,100,624 (Shideler) discloses a toy. U.S. Pat. No. 3,721,414 (Yoder) discloses a baby tender.

U.S. Pat. No. 5,577,466 (Luxford) discloses a modular play structure for animals, positionable upon a support surface, comprising a base engageable with the support surface, a plurality of elongated spacer members, with each member having opposing ends. The plurality of spacer members are releasably attached end to end to adjacent spacer members in a linear configuration to form an elongated pole having two opposite ends. The interconnection of the adjacent ends spacer members forms a threaded connector assembly. One end of the pole is releasably attached to the base to support the pole in a vertical orientation relative to the base and the support structure. The pole and base together form a base unit. A structural piece is attachable between two spacer members to act as a platform to support a cat. The base units can be interconnected by structural pieces.

U.S. Pat. No. 4,790,265 (Manson) discloses a cat scratching post and exercise center that includes a flat board, which forms a base member for supporting at longitudinally spaced, in line positions, a pair of posts which extend vertically upwardly therefrom and parallel to each other. A cylindrical cross bar is fixedly mounted at opposite ends to respective posts and spans horizontally between the posts at some distance above the base. Preferably, the top surface of the base member and the side surface of the vertical posts are covered with carpeting. A small diameter object may be suspended by a string from the center of the cross bar at some height above the base, so as to be freely swung by a cat in pendulum fashion.

U.S. Pat. No. 5,496,232 (Morris, et al.) discloses a modular playground equipment system, which includes a platform that supports all other members of the system. The platform is constructed of four angular side connectors, which are attached at the ends thereof, so as to form a rectangular base. A support column is rigidly attached to each corner of the base. Each of the support columns includes an inner angle and an outer angle, which angles are attached to one another by a weld bead at the corners thereof. A stanchion is rigidly attached to the outer angle of each of the columns. Each stanchion extends upwardly from the column, for connection to a roof module, and extends downwardly for contact with the ground or whatever foundation is provided for placement of the playground equipment. The modular assembly mechanism is adapted for attachment of a variety of commercially available playground equipment modules, including lower level modules, such as slides and stairs, as well as upper level modules, such as fish eye windows, safety rails, and tunnels.

U.S. Pat. No. D334,254 (Mitchell) discloses an ornamental design for a combined cat playground, scratching post, exerciser and perch.

U.S. Pat. No. 5,577,465 (Cook) discloses a kit for assembling an expandable pet enclosure and climbing device. A kit for constructing an expandable pet climbing device is provided that has a set of linear beams, corner members, and end caps. The linear beams and the end caps are generally padded with a carpet-like material. The corner members have a body and outwardly-directed prongs disposed at right angles to adjacent prongs. Using the kit of the invention, a pet owner can custom assemble a pet climbing device.

U.S. Pat. No. 5,913,750 (Smithback) discloses a Feline exercise and entertainment center, which also serves as a cat perch, central cat feeding, and hygiene station, which has a frame constructed of conventional dimensioned timber that supports a horizontal perch in cantilever fashion. An inclined treadmill with a closed loop belt encircling a plurality of rotatable rollers extends between a support surface and the perch. The cat makes his way to the perch by climbing the treadmill, which may be set at varying inclinations to suit the cat's weight and strength, to obtain the desired treadmill time for a particular perch entry. The treadmill and the perch are covered by bent sheets of plastic, which confine the cat, and require the cat to traverse the treadmill rather than jumping to the perch. The perch may be fitted with a pivotable door to temporarily retain the pet within the perch enclosure for limited times.

U.S. Pat. No. 4,497,279 (Bell) discloses an animal play and exercise structure, for providing exercise, activity, and enjoyment indoors, particularly for a cat, while occupying a minimum amount of space. The structure includes two rigid vertically aligned frames. Each frame has four vertical supports, and the supports have apertures therethrough. Side rods and ladder rods are inserted into the apertures interconnecting the supports to form each of the frames. Ramps are tied to the rods in an inclined manner by leather thongs. Platforms are also secured to the rods, and the ramps provide the cat with access to the platforms. In the preferred embodiment, a decorative roof is attached onto the top frame.

U.S. Pat. No. 6,360,692 (Gear) discloses a kitty corner scratching apparatus that attaches to the outside corner of a wall, and that enables carpet to be easily replaced. The apparatus includes a rigid, V-shaped wall-mounting bracket over which a complimentary-shaped carpet support plate may be attached. The wall-mounting bracket has four screw holes for permanent attachment to the desired position on the outside corner of a wall. Adhesively attached to the outer surface of the carpet support plate is a piece of carpet. The carpet support plate is designed to slide longitudinally over the wall-mounting bracket and then be sufficiently locked in position to support a cat pulling on the carpet. The piece of carpet may be easily replaced when frayed.

U.S. Pat. No. 6,619,237 (Robertson) discloses a recoverable cat-scratching post that includes a base and post, and utilizes removable, cat scratching covers. A base anchor attaches to the base and supports the vertically extending post. A plug fits in a top of the post. A post cover wraps around sides of the post, and has interfitting teeth and grooves, for folding over the top of the post and covering the plug. A base cover folds over sides of the base and attaches to an underside of the base. The base cover also has a hole allowing the post to pass through. The covers are made of a cat-scratchable material, which substantially cover the entire base and post, and are removed, discarded, and replaced at the end of their useful lives. The base and post are not discarded and are continually reused.

U.S. Pat. No. 5,611,721 (Hoeting, et al.) discloses a sound producing ball, which includes concentric inner and outer ball elements and a plurality of sound producing particles in an open area therebetween. The sound producing particles are dimensioned to travel in the open area, when the ball is rotated, and the inner ball element has a plurality of projections thereon, for redirecting the sound producing particles as they travel in the open area. The sounds produced by the sound particles, as they strike the inner and outer ball elements, are generally similar to the sound of rain striking a building roof.

U.S. Pat. No. D334,254 (Mitchell) discloses an ornamental design for a combined cat playground, scratching post, exerciser and perch. U.S. Pat. No. D269,821 (Hurley) discloses an ornamental design for a combined cat playground and exerciser. U.S. Pat. No. D257,293 (Michalski) discloses an ornamental design for a combined cat playground and exerciser.

For the foregoing reasons, there is a need for a cat toy park that has a plurality of cat toys that are stimulating to the cats and felines and that cats and felines can play with and entertain themselves with for extended periods of time. The cat toy park should be capable of being stored, when not in use, and quickly and easily deployed for use, when desired, and have removably replaceable cat toys. The cat toy park should be capable of being folded into a suitcase type structure, when not in use, be easily transported and/or stored as desired, and unfolded into a substantial play area and have a plurality of toys, when deployed for use and entertainment of the cats and felines.

The cat toy park should be capable of being opened and deployed simply, easily, and quickly, and closed, transported, and/or stored quickly, easily, and simply. An assortment and a variety of cat toys should be available for use with the cat toy park, and the cat toys should be capable of being quickly and easily removably installed and removably replaced to and from the cat toy park. The cat toy park should be durable, light weight, inexpensive, safe to use, attractive, sturdy, and of simple construction.

SUMMARY

The present invention is directed to a cat toy park that has a plurality of cat toys that are stimulating to cats and felines and that cats and felines can play with and entertain themselves with for extended periods of time. The cat toy park is capable of being stored, when not in use, and quickly and easily deployed for use, when desired, and has removably replaceable cat toys. The cat toy park is capable of being folded into a suitcase type structure, when not in use, is easily transported and/or stored as desired, and provides a substantial play area and has a plurality of toys, when unfolded and deployed for use and entertainment of the cats and felines.

The cat toy park is capable of being opened and deployed simply, easily, and quickly, and closed, transported, and/or stored quickly, easily, and simply. An assortment and a variety of cat toys is available for use with the cat toy park, and the cat toys are capable of being quickly and easily removably installed and removably replaced to and from the cat toy park. The cat toy park is durable, light weight, inexpensive, safe to use, attractive, sturdy, and of simple construction.

A cat toy park having features of the present invention comprises: a cat toy park having an open configuration and a closed configuration, comprising: a base having opposing base portions and a substantially centrally disposed base portion, the opposing base portions hingedly connected to the substantially centrally disposed base portion, the opposing base portions and the substantially centrally disposed base portion substantially collinear with each other when the cat toy park is in the open configuration, the opposing base portions substantially transverse to the substantially centrally disposed base portion when the cat toy park is in the closed configuration; support arms adapted to be releasably attached to the base, the support arms adapted to be releasably connected one to the other, the support arms extending above the base, when the cat toy park is in the open configuration; at least one cat toy adapted to be removably attached to the cat toy park.

The cat toy park typically has a plurality of removably replaceable suspended cat toys and removably replaceable base mounted cat toys.

DRAWINGS

These and other features, aspects, and advantages of the present invention will become better understood with regard to the following description, appended claims, and accompanying drawings where:

DESCRIPTION

Figure 1:
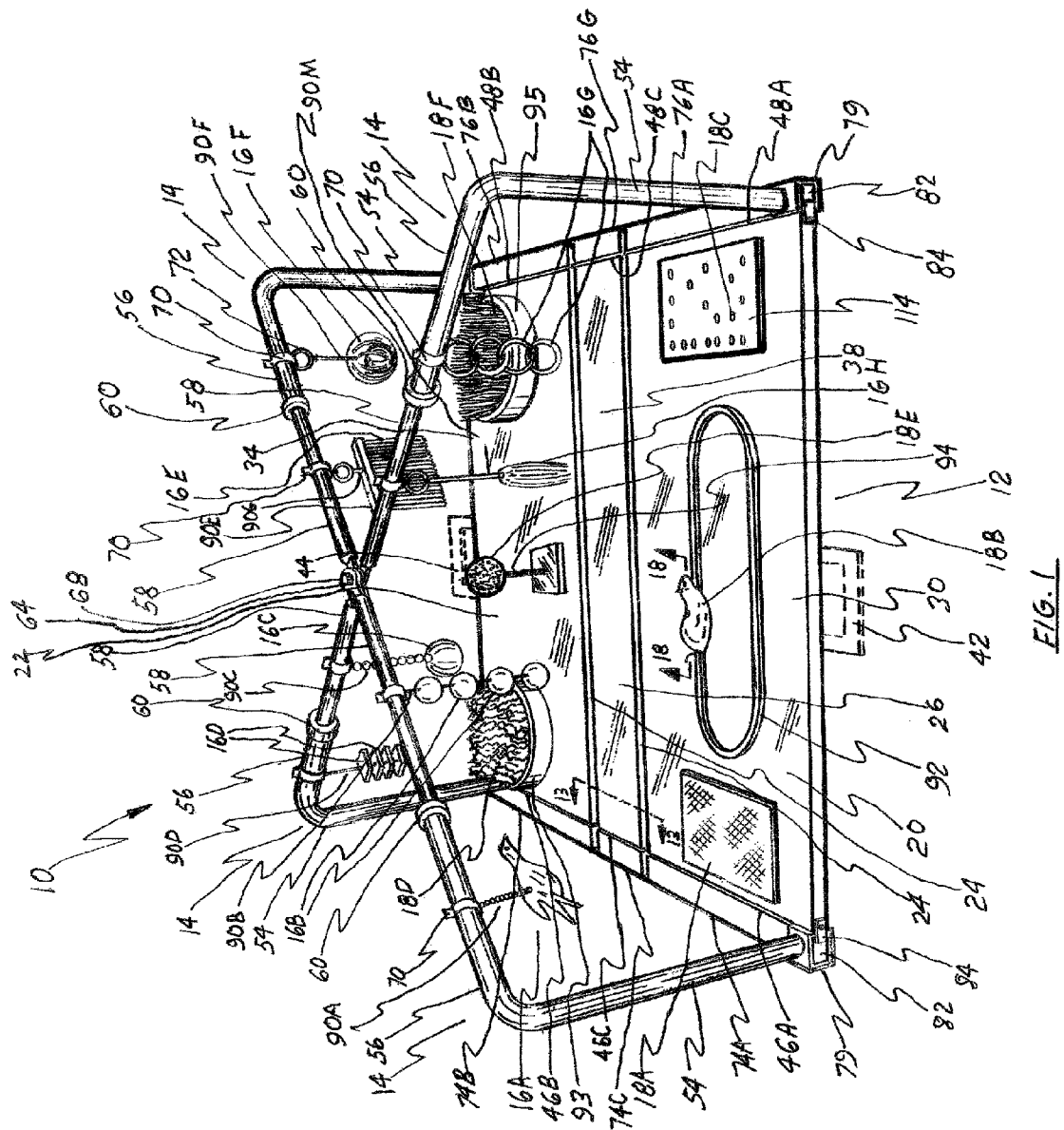
FIG. 1 is a perspective view of a cat toy park showing the cat toy park open, constructed in accordance with the present invention.

The preferred embodiments of the present invention will be described with reference to FIGS. 1-21 of the drawings. Identical elements in the various figures are identified with the same reference numbers.

FIGS. 1-19 show an embodiment of the present invention, a cat toy park 10 comprising base 12, support arms 14, removably replaceable hanging cat toys 16A-16H, and removably replaceable base mounted cat toys 18A-18F. The cat toy park 10 is shown open and ready to use by a cat, feline, other suitable pet or animal in FIG. 1, and closed for storage and portability in FIG. 2.

The base 12 comprises opposing base portions 20 and 22 and substantially centrally disposed base portion 26. The base portions 20 and 22 are hingedly connected to the substantially centrally disposed base portion 26 at hinges 24. The base portions 20 and 22 have removably replaceable fasteners 28, which typically have hook and loop fasteners 29 and opposing adhesive fasteners 31, which may be used to removably fasten the removably replaceable fasteners 28 to the base portions 20 and 22.

The base portion 20 has a first side 30 and an opposing second side 32; the base portion 22 has a first side 34 and an opposing second side 36; and the substantially centrally disposed base portion 26 also has a first side 38 and an opposing second side 40.

The first sides 30, 34, and 38 of the base portions 20 and 22 and the substantially centrally disposed base portion 26, respectively, face upwards when the cat toy park 10 is open, as shown in FIG. 1. The base portions 20 and 22 and the substantially centrally disposed base portion 26 are substantially collinear with each other, when the cat toy park 10 is open.

Figure 2:
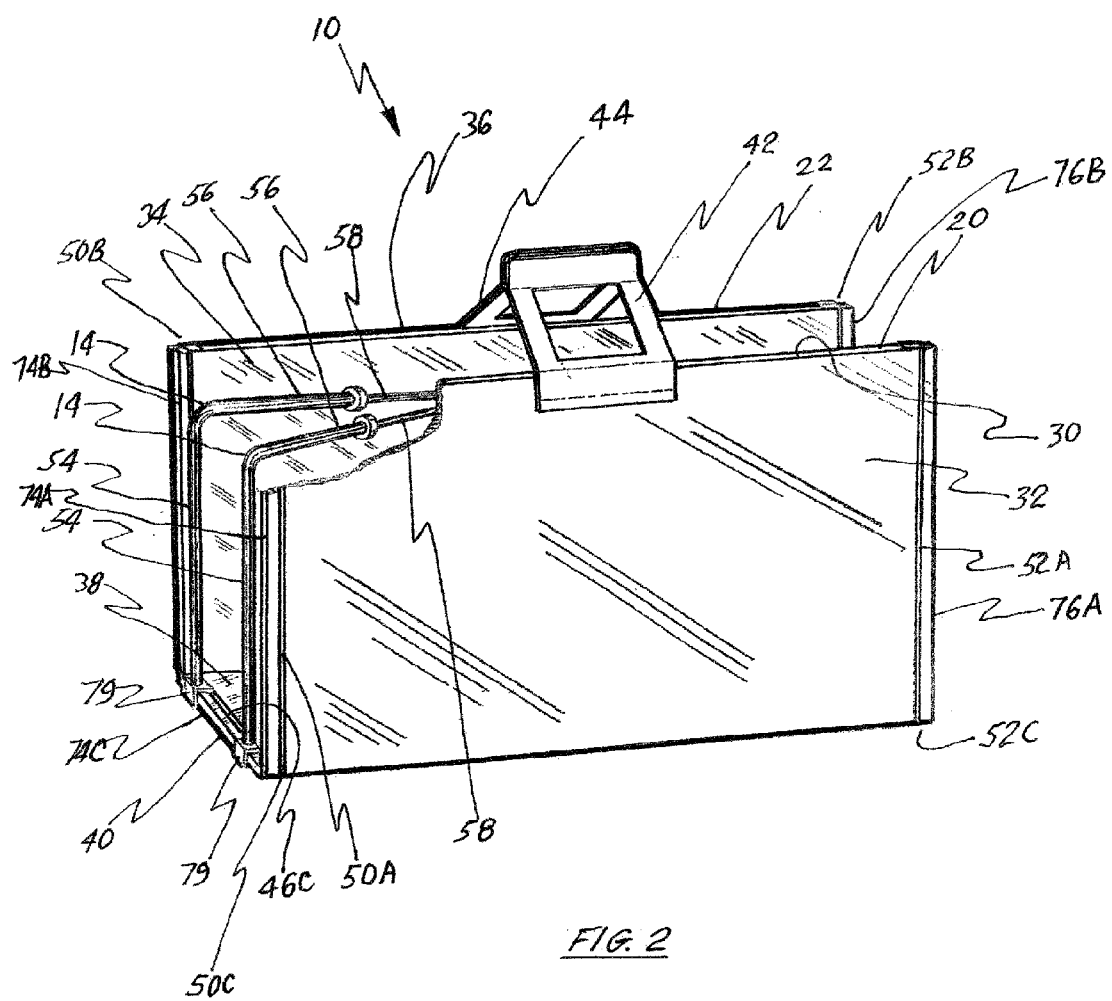
FIG. 2 is a perspective view of the cat toy park showing the cat toy park closed.

The opposing second sides 32 and 36 face outward and the opposing second side 40 typically faces downward when the cat toy park 10 is closed, as shown in FIG. 2. The base portions 20 and 22 are substantially transverse to the substantially centrally disposed base portion 26, when the cat toy park 10 is closed.

Figure 13:
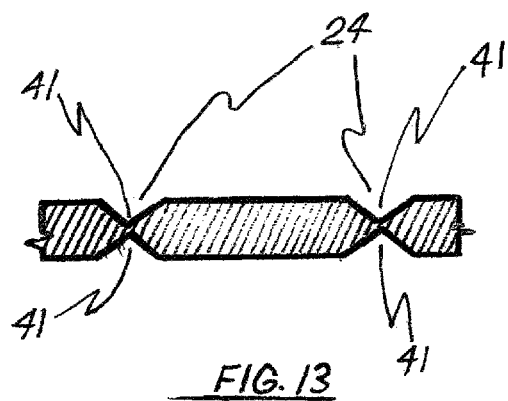
FIG. 13 is a cross section view of hinges of the base of the cat toy park.

The hinges 24 are typically living hinges, having fold lines 41, shown later in FIG. 13, and facilitate opening the cat toy park 10 for use by a cat, feline, other suitable pet or animal, and closing the cat toy park 10 for storage and portability, although other suitable hinges may be used.

The second sides 32 and 36 of the base portions 20 and 22, respectively, are exteriorly disposed, when the cat toy park 10 is closed, as shown in FIG. 2, and indicia or other information may optionally be imprinted and displayed on the second sides 32 and 36 of the base portions 20 and 22, respectively. The base portions 20 and 22 have matingly interlocking handles 42 and 44, which lock one to the other, to facilitate storage and/or carrying the cat toy park 10, when the cat toy park 10 is closed.

Figure 14:
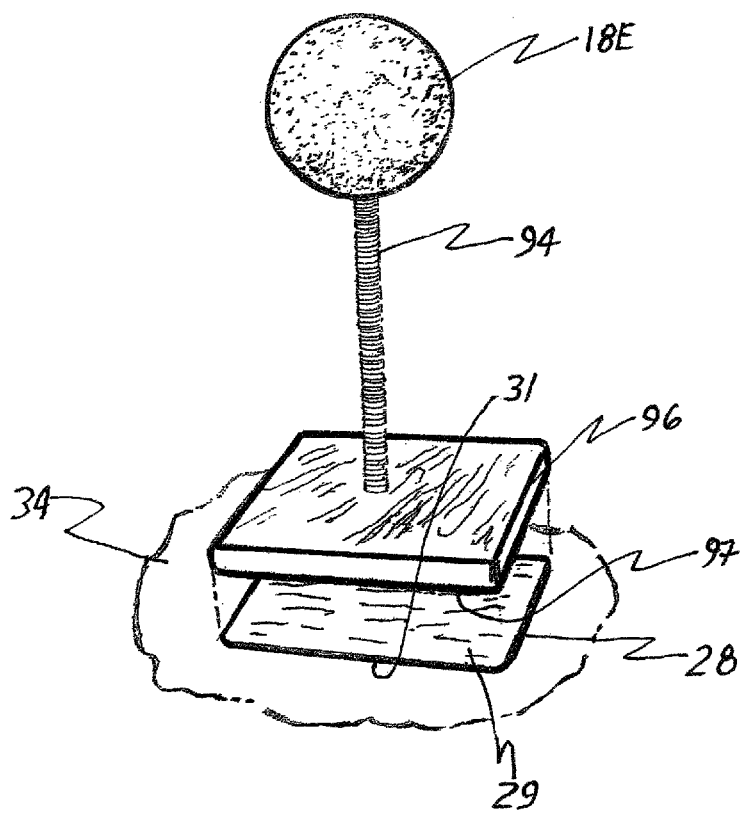
FIG. 14 is a perspective view of a cat toy and mount of the cat toy park.
Figure 15:
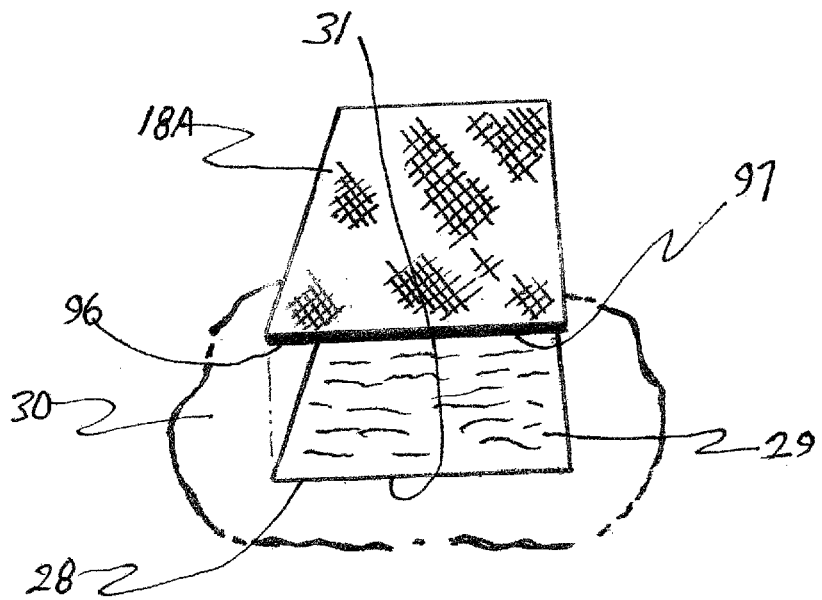
FIG. 15 is a perspective view of another cat toy and another mount of the cat toy park.
Figure 16:
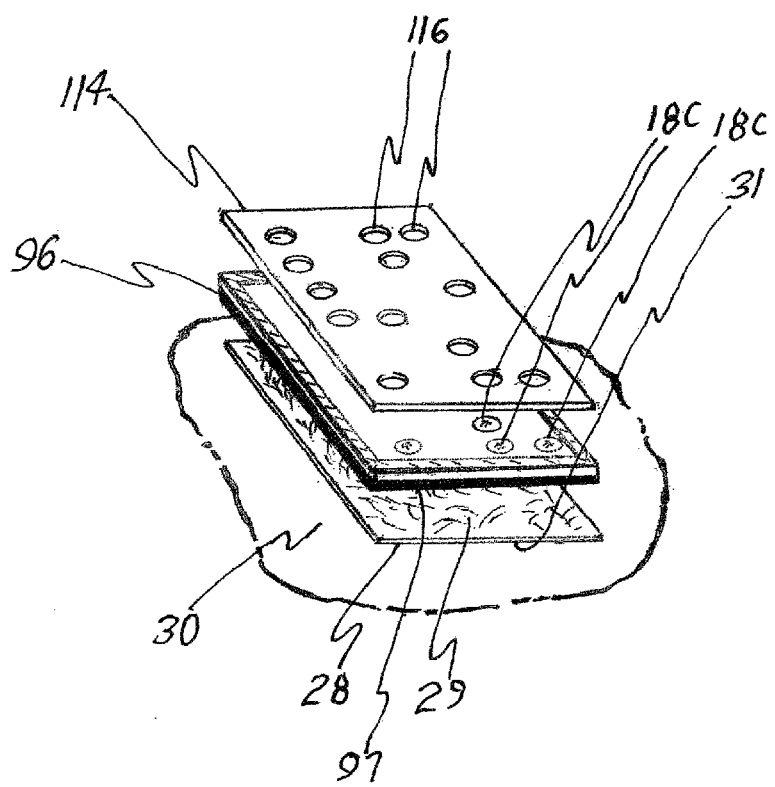
FIG. 16 is a perspective view of another cat toy and another mount of the cat toy park.
Figure 17:
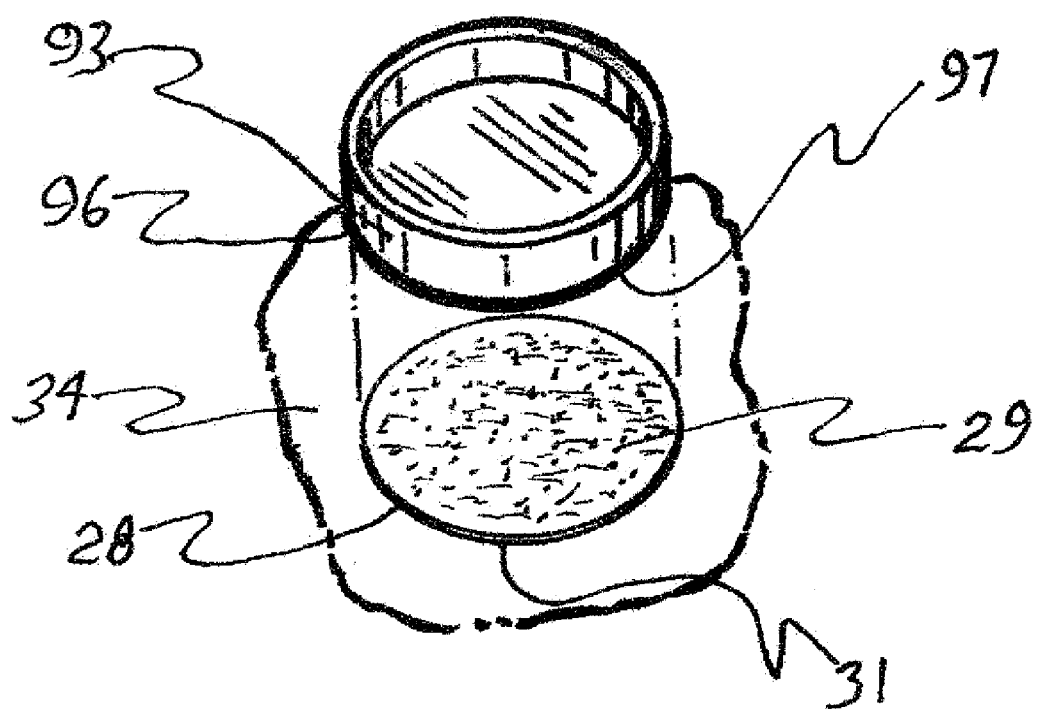
FIG. 17 is a perspective view of a base of another cat toy and another mount of the cat toy park.
Figure 18:
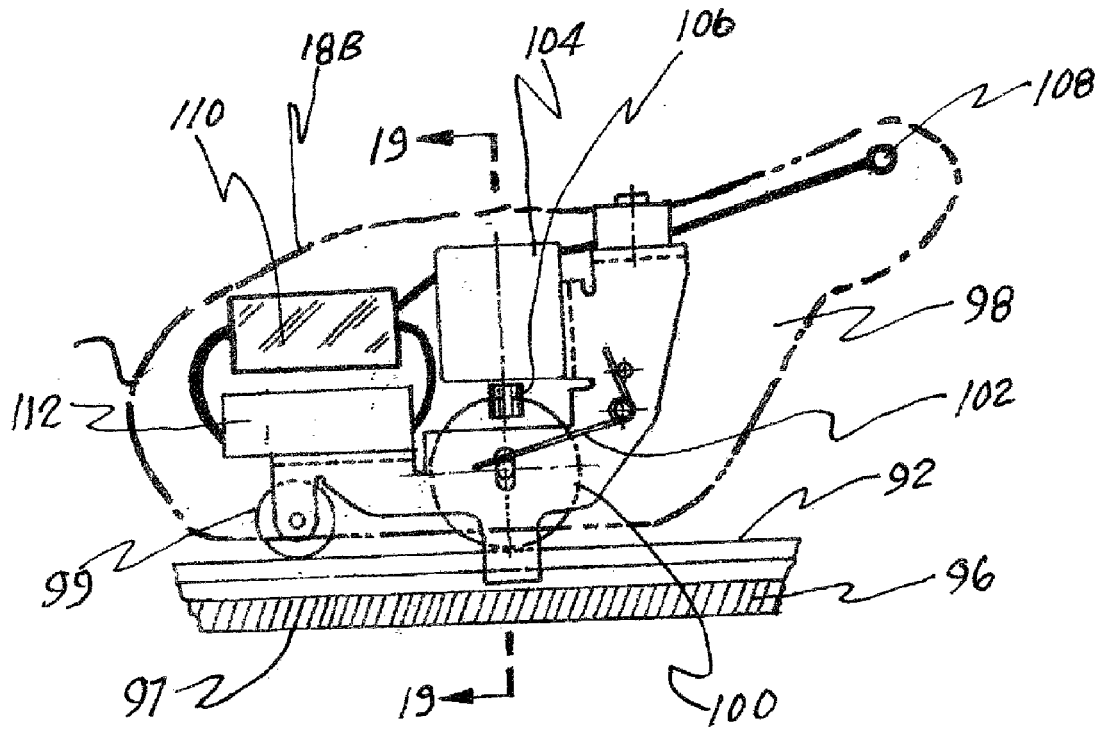
FIG. 18 is a breakaway view of a mouse cat toy and a portion of the base of the cat toy park.
Figure 19:
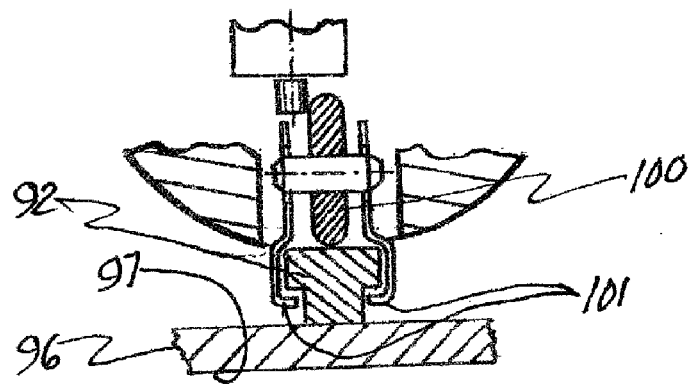
FIG. 19 is a cross section view of the mouse cat toy and the portion of the base of FIG. 18.

The removably replaceable fasteners 28 may be cut to size and removably fastened to the base portions 20 and 22, although other suitable fasteners may be used. The adhesive fasteners 31 removably fasten the removably replaceable fasteners 28 to the first sides 30 and 34 of the base portions 20 and 22, respectively, as shown in FIGS. 14-16.

Each of the removably replaceable base mounted cat toys 18A-18F are removably fastened to the removably replaceable fasteners 28, which are removably fastened to the base portions 20 and 22 at the first sides 30 and 34, respectively, at suitable locations on the base portions 20 and 22, using the removably replaceable fasteners 28, although other suitable removably replaceable base mounted cat toys may be used.

The first sides 30, 34, and 38 of the base portions 20 and 22 and the substantially centrally disposed base portion 26, respectively, have opposing female tracks 46A, 46B, and 46C, respectively, and 48A, 48B, and 48C, respectively, and the second sides 32, 36, and 40 of the base portions 20 and 22 and the substantially centrally disposed base portion 26, respectively, have opposing female tracks 50A, 50B, and 50C, respectively, and 52A, 52B, and 52C, respectively. The female tracks 46A, 46B, and 46C are substantially collinear one to the other; the female tracks 48A, 48B, and 48C are substantially collinear one to the other; the female tracks 50A, 50B, and 50C are substantially collinear one to the other; and the female tracks 52A, 52B, and 52C are substantially collinear one to the other.

Figure 3:
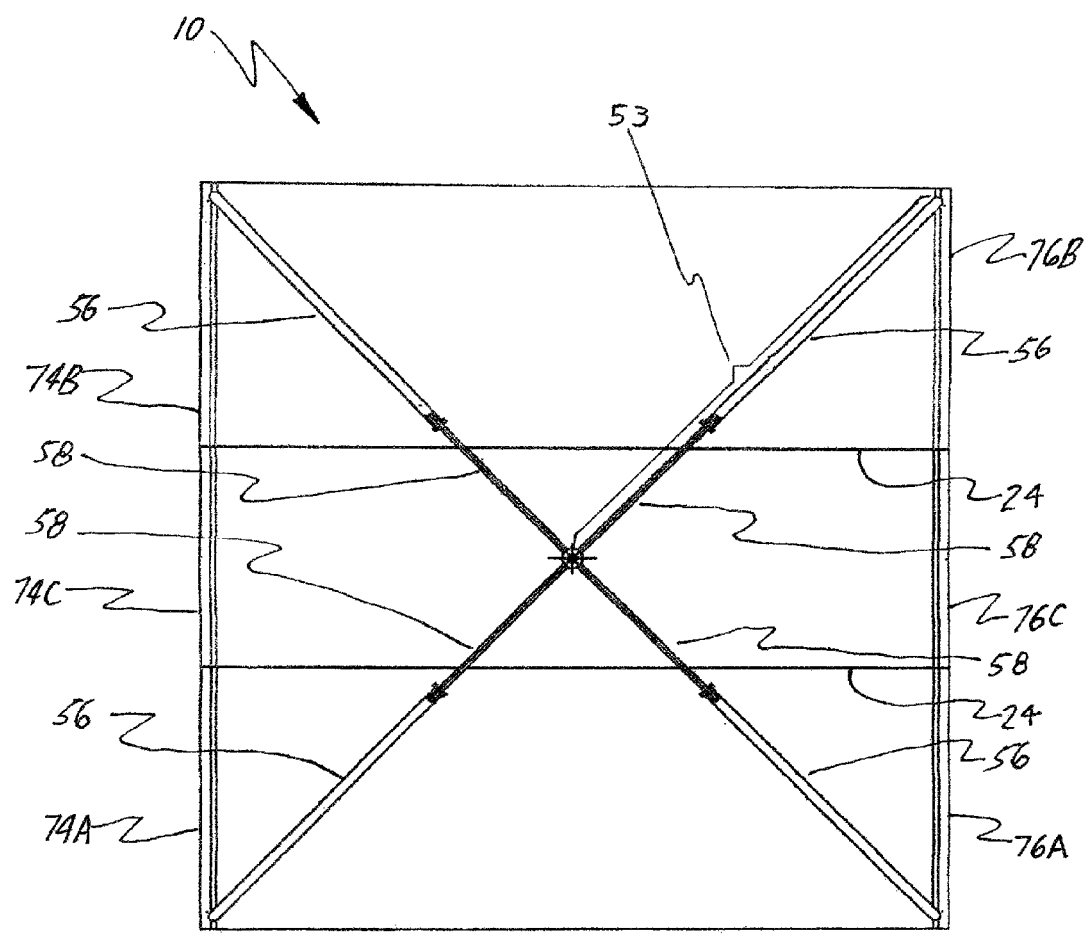
FIG. 3 is a top view of the cat toy park showing the cat toy park open, showing support arms of the cat toy park.
Figure 4:
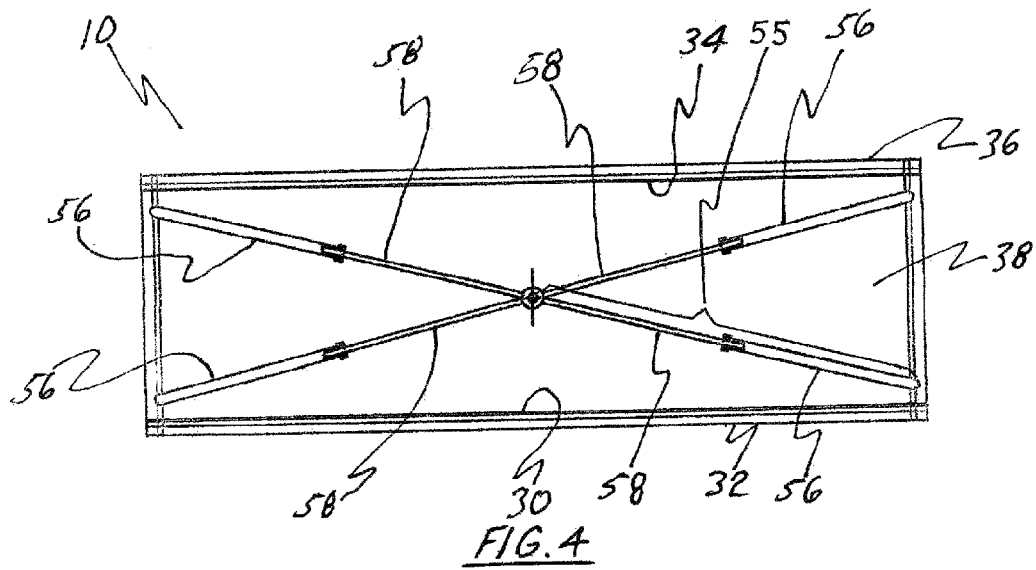
FIG. 4 is a top view of the cat toy park showing the cat toy park closed, showing the support arms of the cat toy park.

Each of the support arms 14 is adapted to adjust from an extended length 53, when the cat toy park 10 is unfolded and deployed for use, as shown in FIGS. 1 and 3, to a retracted length 55, when the cat toy park 10 is closed for storage and/or transportation, as shown in FIGS. 2 and 4, and vice versa. The support arms 14 are also adapted to releasably attach to the base portions 20 and 22 and the substantially centrally disposed base portion 26.

Each of the support arms 14 is substantially "L" shaped, and comprises a support column 54, a substantially centrally directed support member 56 integrally connected to the support column 54, and a telescoping support member 58, which matingly telescopes into the substantially centrally directed support member 56. The configuration of the support arms 14 when the cat toy park 10 is open is shown in FIG. 3, and the configuration of the support arms 14 when the cat toy park 10 is closed is shown in FIG. 4. Details of the support arm 14 are shown in FIGS. 5-12.

The support arms 14 may alternatively be arcuate shaped or have another suitable shape or shapes.

Figure 5:
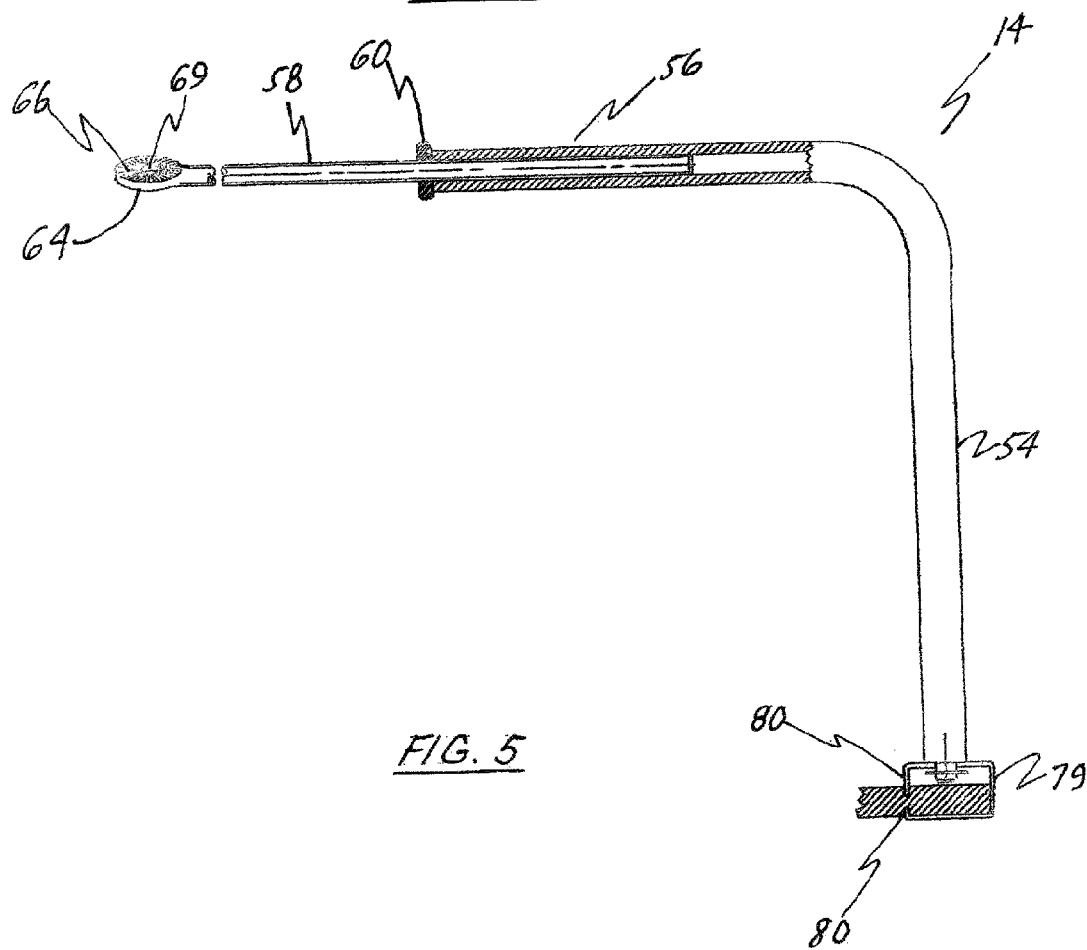
FIG. 5 is a breakaway side view of one of the support arms.
Figure 6:
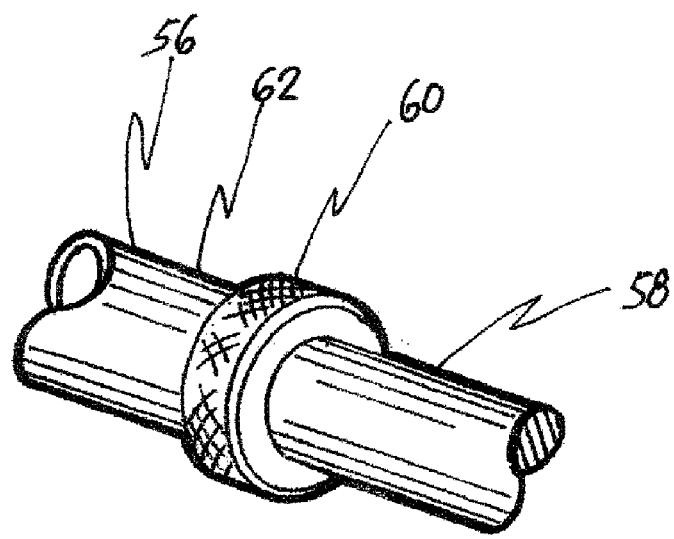
FIG. 6 is a perspective view of another portion of one of the support arms showing a fastener for adjusting the length of the support arm.
Figure 7:
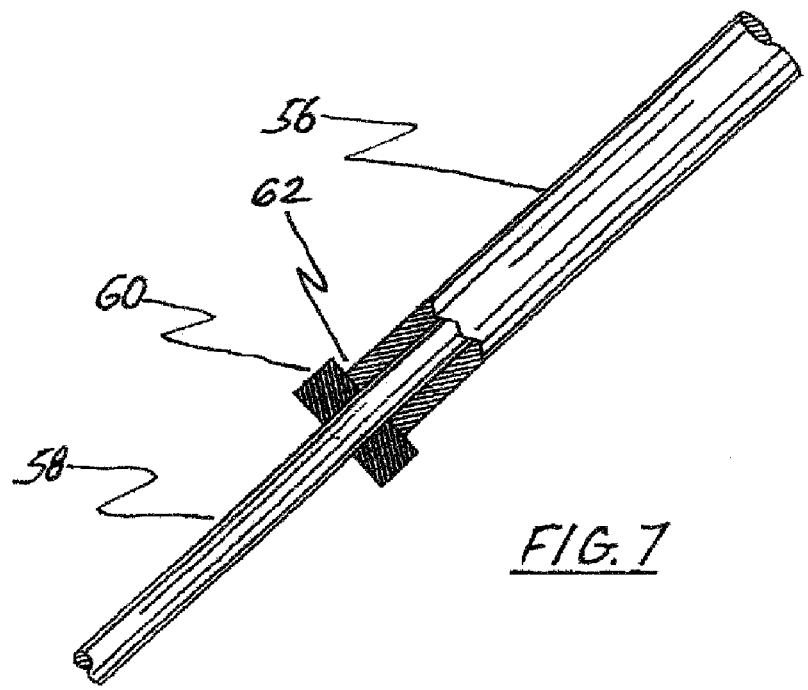
FIG. 7 is a breakaway top view of the portion of the support arm of FIG. 6.

Each of the substantially centrally directed support members 56 is preferably tubular and matingly and slidingly receives one of the telescoping support members 58, which is also preferably tubular, therein, as shown in FIGS. 5-7, although other suitable construction may be used.

The substantially centrally directed support member 56 has rotatable knurled releasable locking fastener 60 about end 62 of the substantially centrally directed support member 56, which releasably and matingly locks the substantially centrally directed support member 56 to the telescoping support member 58 one to the other, which is also shown in FIGS. 5-7.

Figure 8:
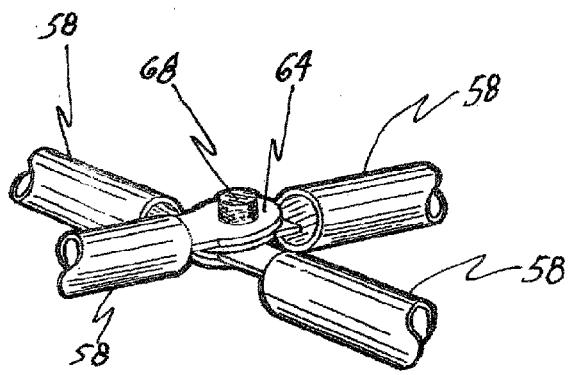
FIG. 8 is a perspective view of other portions of the support arms fastened one to the other with another fastener.
Figure 9:
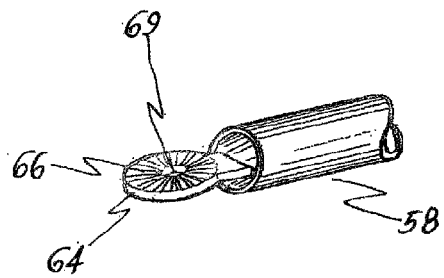
FIG. 9 is a perspective view of one of the portions of one of the support arms of FIG. 8.

Each of the telescoping support members 58 has substantially disk shaped end 64 having teeth 66, as shown in FIGS. 8 and 9, which matingly lock the support arms 14 one to the other, when fastened with releasable fastener 68, as shown in FIG. 8. The substantially disk shaped end 64 also has hole 69 for receiving the releasable fastener 68 therethrough.

Each of the support arms 14 are adjusted to length as shown in FIGS. 1 and 3, locked in place with the rotatable knurled releasable locking fastener 60, and releasably fastened one to the other with the releasable fastener 68, when the cat toy park 10 is open. The rotatable knurled releasable locking fastener 60 and the releasable fastener 68 are released and the support arms 14 are adjusted to lengths as shown in FIGS. 2 and 4 when the cat toy park is closed.

Figure 10:
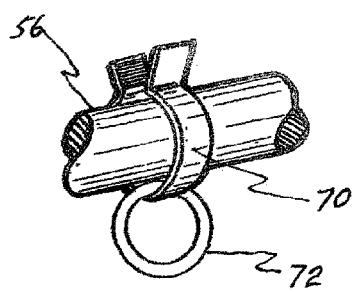
FIG. 10 is a perspective view of another portion of one of the support arms showing a fastener for fastening one of the cat toys to the support arm.

Each of the substantially centrally directed support members 56 and the telescoping support members 58 has removably releasable fasteners 70 about the substantially centrally directed support members 56 and the telescoping support members 58, as shown in FIGS. 1 and 10. Each of the removably releasable fasteners 70 typically has at least one ring 72 held in place by the removably releasable fastener 70, between the substantially centrally directed support members 56 and/or the telescoping support members 58, for supporting the removably replaceable hanging cat toys 16A-16H, as shown in FIGS. 1 and 10, although other suitable support means may be used. Certain ones of the removably replaceable hanging cat toys 16A-16H may alternatively be releasably attached directly to the removably releasable fastener 70. The removably releasable fasteners 70 may be placed at desired locations on the support arms 14.

Figure 11:
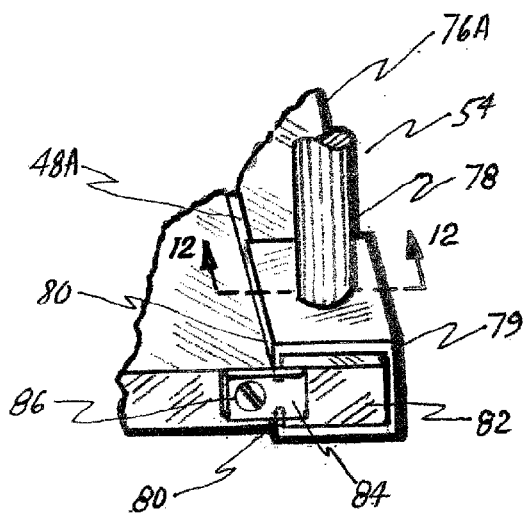
FIG. 11 is an end perspective view of one of the support arms and a corner portion of a base of the cat toy park.
Figure 12:
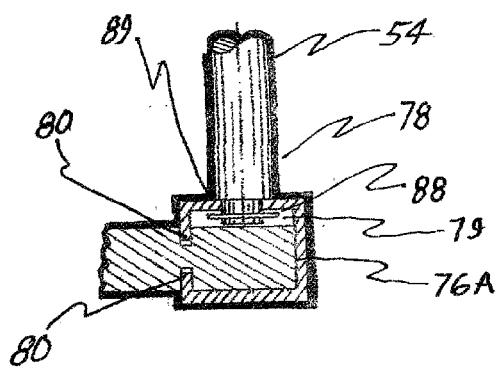
FIG. 12 is a breakaway view of the support arm and the corner portion of the base of FIG. 11.

The base portions 20 and 22 and the substantially centrally disposed base portion 26, respectively, have opposing edges 74A, 74B, and 74C, respectively, and 76A, 76B, and 76C, respectively, as shown in FIG. 1, and partially shown in FIGS. 2, 11, and 12.

Each of the support columns 54 has end 78 having channel 79 connected to the end 78. Each of the channels 79 has male tracks 80, which are slidably and matingly mounted to the cat toy park 10 about the opposing edges 74A and 74B and 76A and 76B of the base portions 20 and 22, respectively, when the cat toy park 10 is open and deployed for use, as shown in FIG. 1. The male tracks 80 are slidably and matingly mounted to the cat toy park 10 with the channels 79 engagingly about the opposing edges 74C and 76C of the substantially centrally disposed base portion 26, as shown in FIG. 2, when the cat toy park 10 is closed for storage or transportation. The channels 79 are, thus, slid from the base portions 20 and 22 to the substantially centrally disposed base portion 26, when closing the cat toy park 10, and vice versa when opening the cat toy park 10.

Each of the channels 79 having the male tracks 80 is substantially rectangular. The male tracks 80 slidingly engage and mate with and are received within the female tracks 46A, 46B, and 46C and 48A, 48B, and 48C and the female tracks 50A, 50B, and 50C and 52A, 52B, and 52C, respectively, as the channels 79 having the male tracks 80 are slid from the base portions 20 and 22 to the substantially centrally disposed base portion 26 and vice versa.

Ends 82 of the opposing edges 74A and 74B and 76A and 76B of the base portions 20 and 22 have stops 84 fastened to the opposing edges 74A and 74B and 76A and 76B of the base portions 20 and 22 with fasteners 86 to prevent the channels 79 having the male tracks 80 from sliding off the base portions 20 and 22, as shown in FIG. 11.

Each of the channels 79 also has spring loaded pin 88, which releasably locks the channels 79 to the base portions 20 and 22 or the substantially centrally disposed base portion 26, as shown in FIG. 12, when the channels 79 are placed into the desired position, and, thus, releasably attach the support arms 14 to the base portions 20 and 22 and the substantially centrally disposed base portion 26. Each of the spring loaded pins 88 has clip 89 to prevent the spring loaded pin 88 from receding into the support columns 54.

The support arms 14 may be removed from the base portions 20 and 22, for replacement or maintenance, by removing the fasteners 86 and the stops 84 from the opposing edges 74A and 74B and 76A and 76B of the base portions 20 and 22.

FIG. 1 shows the removably replaceable hanging cat toys 16A-16H, and FIGS. 1 and 14-19 show the removably replaceable base mounted cat toys 18A-18F.

Each of the removably replaceable hanging cat toys 16A-16H are suspended from one of the removably releasable fasteners 70. The removably replaceable hanging cat toys 16A-16H comprise: a stuffed bird 16A of fabric suspended from the removably releasable fastener 70 with elastic line 90A; a plurality of preferably reflecting balls 16B suspended with resilient line 90B; a cloth ball 16C suspended with a chain 90C; a plurality of rectangular slats 16D suspended with resilient line 90D; a plurality of fabric strips 16E supported by cross arm 90E, which is suspended by resilient line 90G; a ball within a substantially transparent ball 16F suspended by a resilient line 90F; a plurality of rings 16G suspended from the removably releasable fastener 70; and a plurality of feathers 16H suspended with a resilient line 90H. Other suitable ones of the removably replaceable hanging cat toys 16A-16H may additionally and/or alternatively be used.

The removably replaceable base mounted cat toys 18A-18F are described as follows: scratching pad 18A; motorized mouse 18B on substantially T shaped track 92; blinking lights 18C, such as light emitting diodes (LED's), protected by cover 114 having holes 116 therethrough, which are located and adapted to allow light to pass therethrough; crumpled stiffened paper 18D in tray 93; pom pom ball 18E supported by spring 94; and simulated grass 18F in holder 95. Power is supplied to the blinking lights (LED's) 18C with a battery via an electronic circuit, which controls the rate and duration of blinking. Each of the removably replaceable base mounted cat toys 18A-18F has a base 96 having hook and loop fasteners 97, which are used to removably fasten the removably replaceable base mounted cat toys 18A-18F to the hook and loop fasteners 29 of the first sides 30 and 34 of the base portions 20 and 22, respectively, as shown in FIGS. 14-19, although other suitable fasteners may be used.

In more detail, the motorized mouse 18B comprises body 98, wheels 99 and 100 mounted on the substantially T shaped track 92 and forced against the substantially T shaped track 92 with torsion spring 102, which forces the wheel 100 against the substantially T shaped track 92, and arms 101, which prevent the motorized mouse 18B from being forced away from the substantially T shaped track 92 by either the torsion spring 102 or the cat or feline playing with the motorized mouse 18B; gear reduction motor 104, which drives the wheel 100 via gear 106 of the gear reduction motor 104, LED lights 108, circuit board 110, which controls the gear reduction motor 104 and the LED lights 108, and battery 112, which supplies power to the circuit board 110, the gear reduction motor 104 and the LED lights 108. The wheels 99 and 100 are preferably of rubber, although other suitable wheels may be used.

Other suitable ones of the removably replaceable base mounted cat toys 18A-18F may additionally and/or alternatively be used.

The cat toy park 10 may be of metal, such as aluminum or steel, thermoplastics, thermosetting polymers, rubber, wood, compressed wood, or other suitable material or combination thereof.

Figure 20:
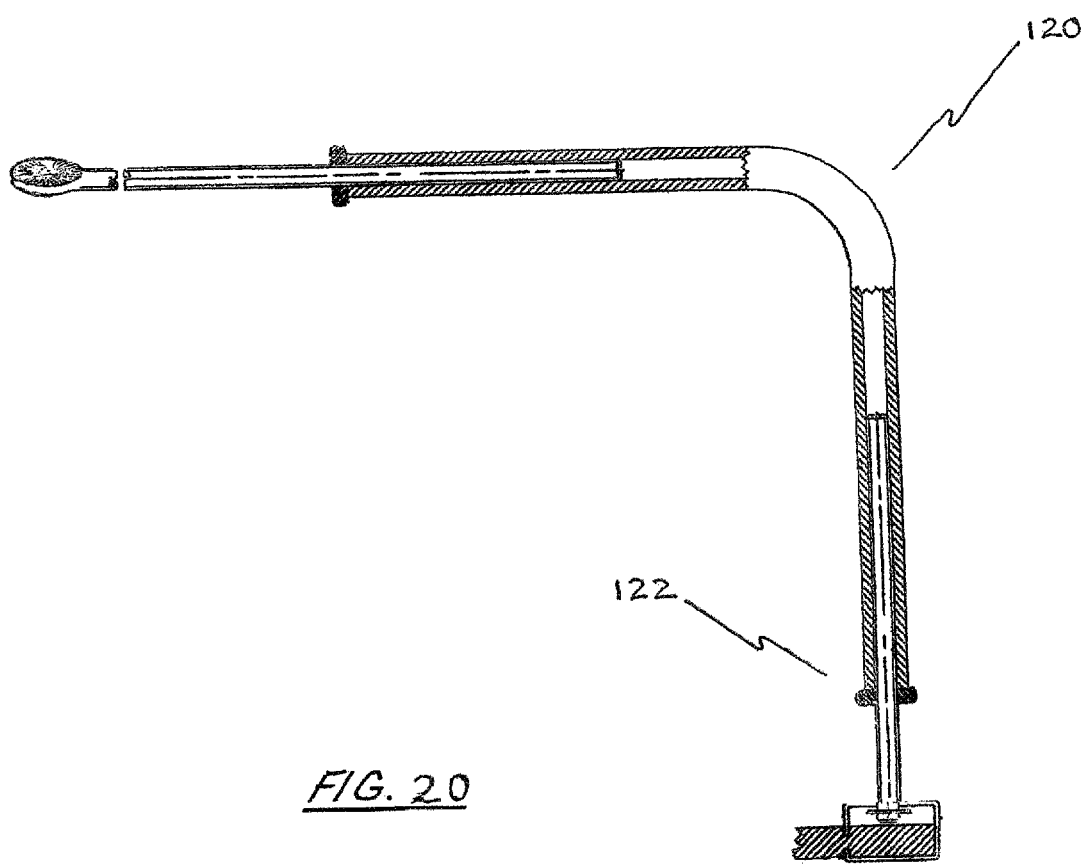
FIG. 20 is a breakaway side view of an alternate one of the support arms.

FIG. 20 shows an alternate embodiment of a support arm 120, which is substantially the same as the support arm 14, except that the support arm 120 has telescoping support column 122, which is adapted to adjust from an extended height to a retracted height and vice versa. Each of the support arms 120 may be adjusted from an extended height to a retracted height and vice versa.

Figure 21:
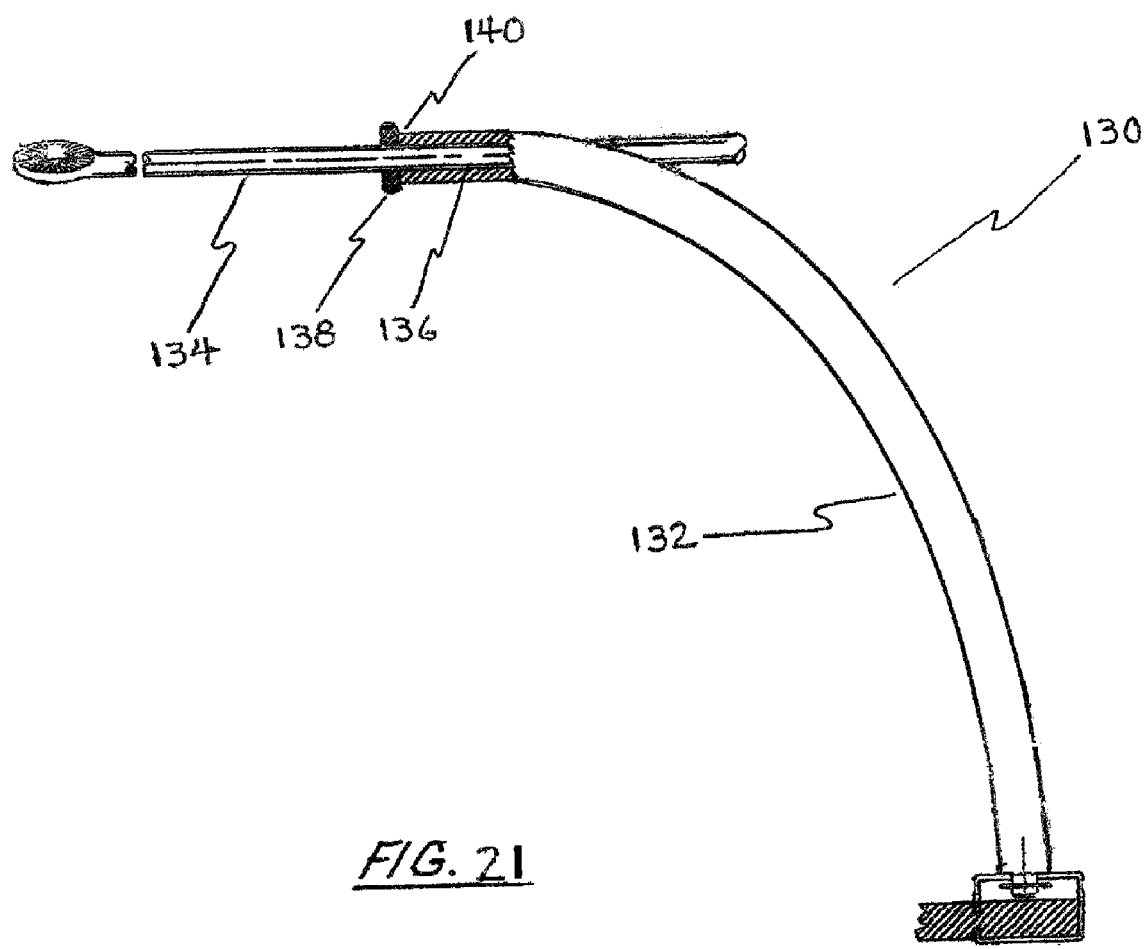
FIG. 21 is a breakaway side view of another alternate one of the support arms.

FIG. 21 shows an alternate embodiment of a support arm 130, which is substantially the same as the support arm 14, except that the support arm 130 has substantially arcuate shaped support column 132, which is substantially centrally directed, and substantially centrally directed support member 134.

Each of the support arms 130 is adapted to adjust from an extended length, when the cat toy park 10 is unfolded and deployed for use, to a retracted length, when the cat toy park 10 is closed for storage and/or transportation, and vice versa.

Each of the substantially arcuate shaped support columns 132 has hollow portion 136, which is adapted to allow the substantially centrally directed support member 134 to matingly slide therethrough and facilitate adjustment of the length of the support arms 130 from the extended length to the retracted length, and vice versa.

Each of the substantially arcuate shaped support columns 132 has rotatable knurled releasable locking fastener 138 about end 140 of the substantially arcuate shaped support columns 132, which releasably and matingly locks the substantially centrally directed support member 134 to the substantially arcuate shaped support columns 132.

Each of the substantially centrally directed support members 134 are preferably tubular, and the hollow portions 136 of the substantially arcuate shaped support columns 132 are also preferably tubular, although other suitable shapes may be used.

Although the present invention has been described in considerable detail with reference to certain preferred versions thereof, other versions are possible. Therefore, the spirit and scope of the appended claims should not be limited to the description of the preferred versions contained herein.

What is claimed is:

1. A cat toy park having an open configuration and a closed configuration, comprising:
   a base having opposing base portions and a substantially centrally disposed base portion,
      said base having substantially flat opposing sides and opposing edges transverse to said substantially flat opposing sides,
      said base having opposing slot shaped tracks on said substantially flat opposing sides adjacent said opposing edges,
      said opposing base portions hingedly connected to said substantially centrally disposed base portion,
      said opposing base portions and said substantially centrally disposed base portion substantially collinear with each other when said cat toy park is in said open configuration,
      said opposing base portions substantially transverse to said substantially centrally disposed base portion and forming a substantially U shaped configuration when said cat toy park is in said closed configuration;
   opposing support arms adapted to slidably attach to said base along said opposing slot shaped tracks,
      each support arm of said opposing support arms comprising:
         a substantially straight columnar support, a substantially centrally directed substantially straight cat toy support continuous with and substantially perpendicular to said substantially straight columnar support, and a substantially straight cat toy park extension telescopingly mating with said substantially centrally directed substantially straight cat toy support,
         said substantially straight columnar support having a base end having a channel comprising opposing male guides adapted to fit into and slidably mate with said opposing slot shaped tracks and slidably attach to said base about an edge of said opposing edges of said base,
         said substantially straight cat toy park extension having a connector end,
      said opposing support arms adapted to be releasably connected one to the other at each said connector end of each said substantially straight cat toy park extension,
      each said substantially straight columnar support, each said substantially centrally directed substantially straight cat toy support, and each said substantially straight cat toy park extension of said opposing support arms extending above said base, when said cat toy park is in said open configuration;
   at least one cat toy adapted to be removably attached to at least one of said opposing support arms;
   said base adapted to removably mount at least one base mounting cat toy thereto.

2. The cat toy park according to claim 1, wherein:
said at least one base mounting cat toy comprises at least one cat scratching pad.

3. The cat toy park according to claim 2, wherein:
said at least one cat toy comprises a plurality of feathers.

4. The cat toy park according to claim 1, wherein:
said at least one base mounting cat toy is removably mounted to said base with hook and loop fasteners.

5. The cat toy park according to claim 1, wherein:
said at least one cat toy and said at least one base mounting cat toy are adapted to entertain a cat.

6. The cat toy park according to claim 1, wherein:
said at least one cat toy comprises a plurality of feathers.

7. The cat toy park according to claim 1, wherein:
said opposing base portions comprise matingly interlocking handles adapted to secure said opposing base portions one to the other.

8. A portable combination cat toy park and carrier having an open configuration and a closed configuration, comprising:
   a one piece base having substantially parallel fold lines defining opposing board shaped base portions and a substantially centrally disposed board shaped base portion,
      said one piece base having opposing sides and substantially parallel living hinges, each living hinge of said substantially parallel living hinges having opposing grooves on said opposing sides of said one piece base defining said substantially parallel fold lines, said opposing board shaped base portions hingedly connected to said substantially centrally disposed board shaped base portion with said substantially parallel living hinges, said one piece base having opposing edges transverse to said substantially parallel living hinges, said one piece base having substantially parallel slot shaped tracks on each side of said opposing sides, said substantially parallel slot shaped tracks adjacent said opposing edges of said one piece base, said substantially parallel slot shaped tracks substantially perpendicular to said substantially parallel living hinges, said opposing board shaped base portions and said substantially centrally disposed board shaped base portion forming a substantially flat board shaped base when said portable combination cat toy park and carrier is in said open configuration, said one piece base forming a substantially U shaped configuration when said portable combination cat toy park and carrier is in said closed configuration, each substantially U shaped opposing edge of said substantially U shaped opposing edges comprising opposing substantially straight side edges defined by said opposing board shaped base portions and a substantially straight base edge defined by said substantially centrally disposed board shaped base portion, said one piece base adapted to removably mount at least one base mounting cat toy thereto;

opposing support arms adapted to releasably and slidably attach to said base about said substantially parallel slot shaped tracks, each support arm of said opposing support arms comprising:

a right cylindrical tubular columnar support and a substantially centrally directed right cylindrical tubular cat toy support continuous with and substantially perpendicular to said right cylindrical tubular columnar support, said right cylindrical tubular columnar support having a base end, said substantially centrally directed right cylindrical tubular cat toy support having a cylindrical receiving end, said substantially centrally directed right cylindrical tubular cat toy support adapted to removably hang at least one first hanging cat toy therefrom, a channel connected to said base end of said right cylindrical tubular columnar support, said channel having opposing male guides adapted to fit into and releasably and slidably mate with said substantially parallel slot shaped tracks on said opposing sides and releasably and slidably attach to said one piece base about an edge of said opposing edges of said one piece base, a right cylindrical tubular cat toy support extension having a cylindrical extension end and an attachment end opposing said cylindrical extension end, said cylindrical receiving end of said substantially centrally directed right cylindrical tubular cat toy support adapted to matingly and slidably receive said cylindrical extension end of said right cylindrical tubular cat toy support extension, each said extension end of each said right cylindrical tubular cat toy support extension of said opposing support arms having a connector adapted to releasably attach one to the other said extension end in a plurality of releasably fixed angular positions, said right cylindrical tubular cat toy support extension adapted to removably hang at least one second hanging cat toy therefrom.

9. The portable combination cat toy park and carrier according to claim 8, wherein:

said at least one base mounting cat toy comprises at least one cat scratching pad.

10. The portable combination cat toy park and carrier according to claim 9, wherein:

said at least one first hanging cat toy comprises a plurality of feathers and/or said at least one second hanging cat toy comprises a plurality of feathers.

11. The portable combination cat toy park and carrier according to claim 8, wherein:

said at least one base mounting cat toy is removably mounted to said one piece base with hook and loop fasteners.

12. The portable combination cat toy park and carrier according to claim 8, wherein:

said at least one first hanging cat toy, said at least one second hanging cat toy, and said at least one base mounting cat toy are adapted to entertain a cat.

13. The portable combination cat toy park and carrier according to claim 8, wherein:

said at least one first hanging cat toy comprises a plurality of feathers and/or said at least one second hanging cat toy comprises a plurality of feathers.

14. The portable combination cat toy park and carrier according to claim 8, wherein:

said opposing board shaped base portions comprise matingly interlocking handles adapted to secure said opposing board shaped base portions one to the other.

15. A cat toy park having an open configuration and a closed configuration, comprising:

a base having opposing base portions and a substantially centrally disposed base portion, said base having substantially flat opposing sides and opposing edges transverse to said substantially flat opposing sides, said base having opposing guide tracks adjacent said opposing edges, said opposing base portions hingedly connected to said substantially centrally disposed base portion, said opposing base portions and said substantially centrally disposed base portion substantially collinear with each other when said cat toy park is in said open configuration, said opposing base portions substantially transverse to said substantially centrally disposed base portion and forming a substantially U shaped configuration when said cat toy park is in said closed configuration;

opposing support arms comprising:

substantially straight columnar supports having linear guides adapted to slidably attach to said base along said opposing guide tracks, substantially centrally directed substantially straight cat toy supports connected to and substantially perpendicular to said substantially straight columnar supports, substantially straight cat toy park extensions telescopingly mating with said substantially centrally directed substantially straight cat toy support, said substantially straight cat toy park extensions having connector ends, said opposing support arms adapted to be releasably connected one to the other at said connector ends, said substantially straight columnar supports, said substantially centrally directed substantially straight cat toy supports, and said substantially straight cat toy park extensions extending above said base, when said cat toy park is in said open configuration;

at least one cat toy adapted to be removably attached to at least one of said opposing support arms;

said base adapted to removably mount at least one base mounting cat toy thereto.

16. The cat toy park according to claim 15, wherein:
said at least one base mounting cat toy comprises at least one cat scratching pad.

17. The cat toy park according to claim 16, wherein:
said at least one cat toy comprises a plurality of feathers.

18. The cat toy park according to claim 15, wherein:
said at least one base mounting cat toy is removably mounted to said base with hook and loop fasteners.

19. The cat toy park according to claim 15, wherein:
said at least one cat toy and said at least one base mounting cat toy are adapted to entertain a cat.

20. The cat toy park according to claim 5, wherein:
said at least one cat toy comprises a plurality of feathers.

21. The said at least one cat toy according to claim 15, wherein:
said opposing base portions comprise matingly interlocking handles adapted to secure said opposing base portions one to the other.

* * * * *